May 22, 1962 J. W. TRUMPY 3,036,269

DISCRIMINATOR CIRCUIT

Filed Oct. 6, 1959

INVENTOR.
JAY W. TRUMPY
BY
Edwin Coates
ATTORNEY.

United States Patent Office 3,036,269 Patented May 22, 1962

3,036,269

DISCRIMINATOR CIRCUIT

Jay W. Trumpy, Pacific Palisades, Calif., assignor to Douglas Aircraft Company, Inc., Santa Monica, Calif.

Filed Oct. 6, 1959, Ser. No. 844,699
6 Claims. (Cl. 324—79)

Figures 1, 2:
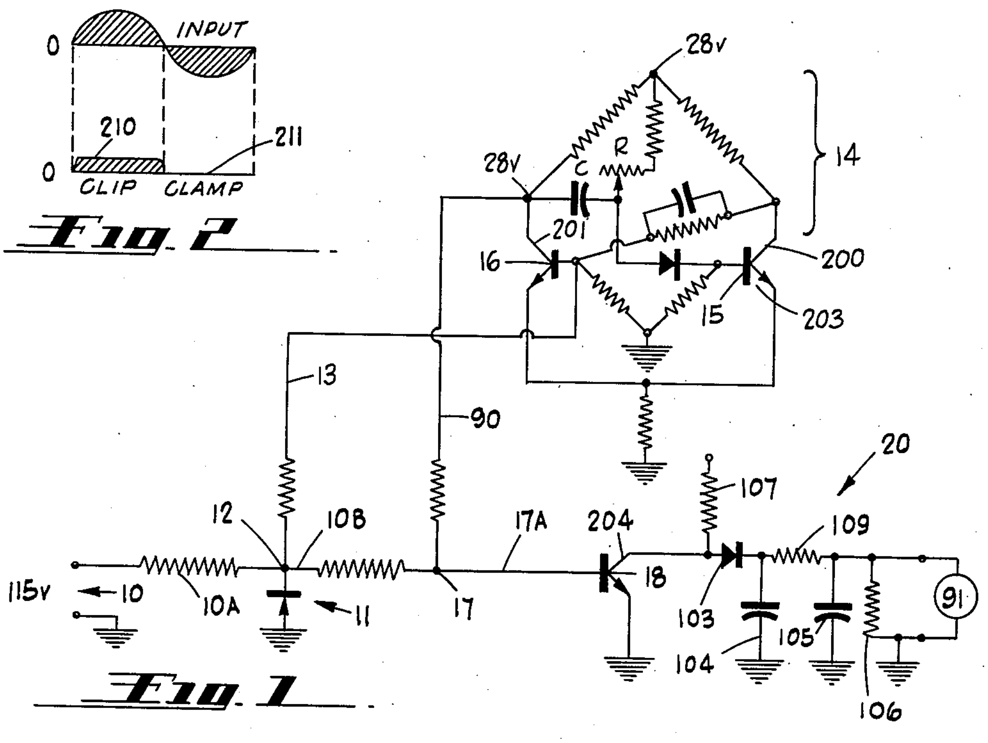

This invention has to do with A.C. power supply apparatus and is particularly concerned with ascertaining the frequency magnitude of a supply source of A.C. power of unknown frequency.

It is not restricted in its objectives to the aforestated one, however, and also concerns itself to de-modulate frequency-modulated A.C. signals.

Although originated to adapt itself for the aforesaid functions at the ground stations for monitoring signals received from guided missiles, it will be made manifest that the essence of the invention is applicable anywhere in technology that it is desired to ascertain the frequency, or changes in frequency, of an A.C. source or circuit. For example, it readily lends itself for use as a frequency meter in an industrial power plant or even in radio receivers.

Broadly, the invention functions by detecting the difference in frequency between an A.C. signal of undetermined frequency and that of a pre-set or predetermined reference frequency.

In one of the currently contemplated embodiments of the invention, the reference frequency is obtained from a mono-stable vibrator, of substantially conventional nature. It thus includes a pair of transistors in a conventional vibrator network, hereinafter detailed.

The A.C. signal of unknown frequency is divided, part being directed to a Zener diode through which only the positive half of the A.C. sinusoidal wave train is passed. The remainder of the signal is directed onwardly in the circuitry.

The clipped rectified positive half-wave of the signal of undetermined frequency, is passed as a square wave signal to the vibrator, which it unbalances. Thus, the vibrator returns to the original condition with only one of the pair of transistors in the vibrator then conducting. The output signal from the unbalanced vibrator is then joined to the signal passing straight through the Zener diode and thence passed to a switched amplifier which may well consist of a transistor.

As long as the vibrator is in its stable condition, this amplifier is at a potential only slightly above zero. When the vibrator is imbalanced, as above, however, it cannot maintain the switched amplifier at even a low positive potential. However, the Zener diode is now in a positive condition and maintains the amplifier at a low positive potential.

The sine wave of the A.C. source signal ends its positive excursion before the vibrator resets itself and this fact causes the switched amplifier to rise to a high potential and emit a pulse. Thus the amplifier is of positive polarity only during the interval between the end of the positive excursion of the sine-wave and the self resetting of the vibrator.

It follows that the width of the pulse emanating from the switched amplifier corresponds to the frequency difference between the frequency to be ascertained and the known, or reference, frequency. By means of a substantially conventional filter located onwardly from the switched amplifier and connected onwardly to an ordinary D.C. voltmeter, for example, the indications of the latter give an indication of the frequency sought, that of the initial A.C. input signal.

Thus, the invention essentially employs a conventional multivibrator embodying a pair of transistors in its network and means are provided for constraining this vibrator to cooperate in a novel mode with the clipped positive half waves of the "unknown" source to vary the potential of a switched amplifier, which is preferably a transistor. Preferably, the latter transistor feeds a conventional filter and the circuitry terminates in a suitable indicator, such as a D.C. voltmeter.

Figure 3:
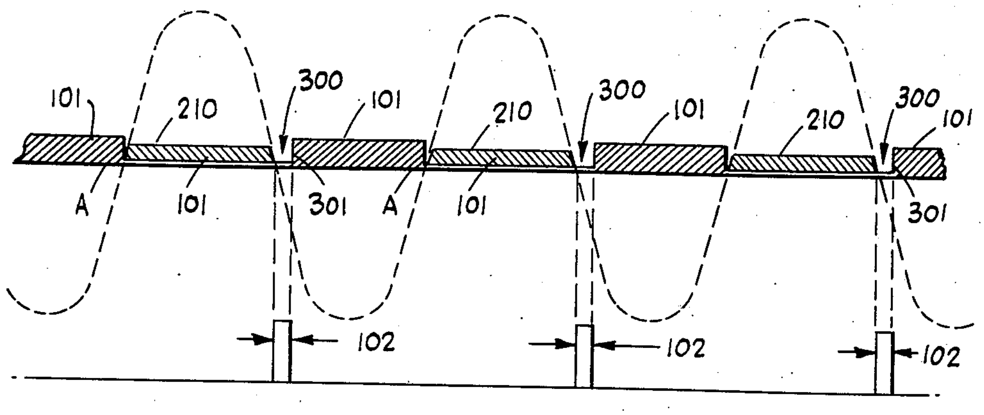

The now-preferred embodiment of these, and other, concepts, is illustrated, only by way of example, in the accompanying drawings, in which FIG. 1 is a diagram of a circuit which incorporates the invention;

FIG. 2 is a diagram illustrating the clipping and clamping effects of the Zener diode as incorporated in the circuitry, and FIG. 3 is a diagram showing the train of discrete pulses emanating from the switched amplifier and showing the clipped A.C. input.

Referring first to FIG. 1, the circuitry includes a source of A.C. energy. Although the voltage at 10 is known, usually 115 v. for the present specific purposes, its frequency is unknown and is to be ascertained by means constituting the present invention.

Energy from 10 is passed through a protective resistor 10A to a division-locus, 12. In shunt at this junction is a Zener diode, 11, connected to ground. In the usual manner, element 11 conducts in its forward direction to short out the negative half of the sinusoidal A.-C., wave thus clamping this wave train to ground. However, the positive halves of the sine wave rise until they reach the pre-set regulating voltage level of the Zener diode. Positive voltages above this level are clipped by the usual reverse conduction through the diode. The clipping and clamping of the sine wave are shown in the lower half of FIG. 2. Thereafter, the resultant positive, square-wave train divides and passes into conductors 13 and 10B.

The essential purpose of the group that includes 11 is to eliminate the negative part of the input wave while retaining the desired sharp rise of the positive voltage and also limiting the value of the positive voltage to a nominal one, all for reasons later made manifest.

Conductor 13 leads this positive, square-wave train to a conventional single-shot chopper, 14, which is a mono-stable multi-vibrator. As is well known, such a multi-vibrator is triggered into an unstable condition or mode by this electrical pulse, but will return automatically to its stable condition after a predetermined lapse of time. This period of time is pre-set by suitable adjustments of the values of the elements R and C thereof.

In detail, considering the conventional operation of member or network 14, the signal from 12 through 13 to 14, alters transistor 16 from a non-conducting condition to a conducting condition, whereupon transistor 15 is thereby made to cease conducting.

For, when 14 is in its "stable" state, transistor 15 conducts, because its base's current is derived directly from the 28 volt supply, shown, assuming the voltage at 10 to be 115 v. The base is shown as a solid rectangle. This base current of transistor 16 is, of course, dependent upon the voltage of the collector 200 of transistor 15. Normally, transistor 15 is in a conducting condition, which fact causes the voltage in the circiut to drop to so low a value that no current flows to the base of transistor 16, also shown as a solid rectangle. This stoppage shuts off the current to the collector 201 of 16.

Therefore, when the chopper 14 is at rest, the collector 201 of transistor 16, is in its highest voltage state.

When a positive pulse through 13 triggers transistor 16, the pulse being applied to its base, then its collector 201 begins to pass current, thereby causing a voltage drop at said collector. This is referred to as a negative swing thereat, and is coupled through capacitor C of the vibrator directly to the base of transistor 15. This coupling interrupts the base current in 15 and also cuts off its collector current. These actions cause the voltage at the collector 200 of transistor 15 to rise sharply, resulting in current flowing to the base or solid rectangle of transistor 16. This last base current is an amplification of the original trigger pulse, it having been amplified through transistors 15 and 16 and now re-applied at the base of transistor 16. When transistor 16 conducts, capacitor C holds the base circuit of transistor 15 at a negative potential until current through resistor R recharges capacitor C. The right-hand "side" of C then charges from a negative potential up toward equality with the voltage of the 28 v. slipped down inputs shown.

When the overall voltage rises above the voltage of the emitter 203 of transistor 15, it causes collector current 200 to flow, resulting in transistor 15 resuming conduction. Thus, the collector voltage of 16 rises, with the result that the multi-vibrator 14 returns to its stable condition until triggered again.

During the operation of the invention, the multi-vibrator "snaps" from the one state to the other rapidly, because its circuitry is regenerative, as is well known. The voltage that initiates this snap-action is instantly amplified through both transistors, 15 and 16 and is applied back to the initiating point.

When the vibrator snaps back to its original condition, this action and circuitry force the "switched amplifier" 18, later detailed, to return to its conducting state which, as will later be perceived, has been interrupted by the action of the vibrator.

It will be observed that this triggered condition of the vibrator interrupts that current which, it will be perceived, normally passes through a conductor 90 to a tie-in point 17 on conductor path 17A.

Referring more in detail to switched amplifier 18, it can be considered as a transistor for shorting the "lower" end of resistor 107 to ground when current flows in the collector 204 of 18. 18 is "closed" whenever current flows through conductor 17A to the base of the transistor 18, resulting in the flow of an amplified current from the collector of 18.

Either the positive excursion of the aforementioned sinusoidal wave through 10B and 17A or the "rest" condition of vibrator 14 through 90 will send currents to 18 to keep it closed. Due to said positive excursion, current will flow to it through 10B and 17A; when 14 is at rest, current will flow to it through 90 and 17A.

However, when neither of the two just aforesaid currents is flowing, 18 opens so that current flows through resistor 107 and diode 103 into capacitor 104. The diode 103 prevents the charge on capacitor 104 back-flowing when 18 returns to its closed state. Thus, the charge on capacitor 104 is dependent on the time the switch 18 is open.

The action of this part of the system includes the facts that each positive incoming wave triggers the multi-vibrator, resulting in the latter's being unable to hold 18 closed. At the same time, the incoming positive wave substitutes a current which continues to keep the switch closed. If the multi-vibrator re-sets itself while this incoming wave is still positive, the switch 18 is not "opened" and no output therefrom is obtained. The switch 18 conducts only when in the "open" state.

By pre-calibrating, or adjusting, the re-set period of vibrator 14 so that this period is longer than the time of the positive excursion of the input A.-C., pulses are generated in this described "first" part of the total system, which pulses are equal to this difference in time.

Thus, the collector 204 of element 18 is positive only during the short time interval lying between the end of the positive excursion of the A.-C. since wave and the time at which the vibrator 14 automatically re-sets itself.

From all the foregoing, it follows that the width of the pulses, 102, at 18 corresponds to the difference in frequency, or period, between that of the signal at 10 and the reference period emanating from 14 through 90 and 17A.

The items at the right-hand portion of the circuit constitute a more or less conventional filter group 20, comprising resistor 107, rectifier 103, resistors 109 and 106 and grounded capacitors 104 and 105, all in combination as shown. Filter group 20 receives the train of discrete pulses 102, shown in FIG. 3, that emanate from 18, and integrates them into a D.C. potential across capacitor 105. A suitable indicating device at 91, such as an ordinary D.C. voltmeter, is, by way of example, utilized to show the discrepancy produced by the difference in time vs. voltage that exists between the duration of the clipped, or positive, portion of the sinusoidal input A.C. wave train and the duration of the time vs. voltage period required for the single-shot chopper, or multivibrator, to re-set itself. As aforesaid, this will give a definite indication of the frequency of source 10, the A.C. input signal.

An outstanding feature of the invention resides in the fact that all three of the transistors, 15, 16 and 18 function in a novel switching "mode." Among other things, this obviously from the foregoing minimizes the stability problems which are inherent in circuits of the type which require the controlling of a transistor type current at a definite value.

It will be noted that 14 includes two such transistors and each operates for an individual predetermined period each time the vibrator 14 is triggered via 13 by the "unknown frequency" A.C. input signal. The third one of such transistors, 18, functions mainly as a "switched amplifier," being normally in a conducting state, for it is de-energized only during the interval between the end of the positive half of the input signal and the automatic re-setting of the multivibrator. Thus, 18 forms and emits pulses having a width directly proportional to the input signal frequency, 10. That is, the pulse width from 18 varies with the sought frequency differences.

It is also to be noted that the Zener diode is constrained to clip at 210, clamp at 211 and rectify signals from 10, as shown in FIG. 2, and that this is done to render it possible to trigger the vibrator 14 at the steepest part of the sine curve of 10 without thereby causing overloading of the circuitry. It is to be understood that this Zener diode is a single-junction item which shorts out the negative halves of the sinusoidal input A.C. signal by virtue of its possessing forwardly-conducting properties.

Referring more in detail to FIG. 3, 101 represents the current flowing through 90 and 17A with 14 at rest. 210 represents the current flowing through 10B and 17A and is the same wave train as that shown in the lower half of FIG. 2. "A" indicates the point where the input positive wave excursion has triggered 14 into its unstable state, when it then substitutes wave train 210 in order to keep 18 closed. 300 represents the point where 18 opened because of the ending of the aforesaid positive excursion when the sinusoidal wave began its negative excursion, since current 101 was then urged through 10B. 301 represents the end of a gap 300 caused by 14 re-setting itself, the latter event closing 18 again. 102 represents the train of pulses emanating from collector 204 of 18. The widths of elements 102 represents the periods when the switched amplifier is open.

Although certain illustrative parameters, such as voltages, etc., having been employed hereinabove, for the sake of concreteness, it is to be understood that the scope of the invention is limited only by the ambit of the annexed claims.

Although certain illustrative parameters, such as voltages, etc., have been employed hereinabove, for the sake of concreteness, it is to be understood that the scope of the invention is limited only by the ambit of the annexed claims.

I claim:

1. A combination for ascertaining the frequency of an A.C. signal, comprising: a source of A.C. energy of unknown frequency; an electrically unbalanceable, self-resetting reference device adapted to be indirectly connected electrically to said energy source and to emit a reference frequency; means interposed in the path between said source and said reference device and connected to said source and to said device for passing a portion of the energy received by said means to said device in the form of the positive half of the received sinusoidal wave train, said means passing the remainder of said signal onwardly in the combination; a conductor path joining the output signal from said reference device to said onwardly passing remainder; and a semi-conductor device in series in said conductor path and adapted to emit a pulse as a resultant of the energy emanating from the unbalanced reference device and from said remainder of said initial signal; the width of said pulse corresponding to the difference in frequency between the aforesaid unknown frequency to be ascertained and said reference frequency, thus enabling the ascertainment of the unknown frequency.

2. In combination: a source of A.C. energy of unknown frequency; a Zener diode in series with said source; a mono-stable multivibrator of known frequency in divided circuit with said diode; a conductor connecting the output of said multivibrator with said conductor-path onwardly of said diode; a switched amplifier in series in said conductor-path onwardly of the connection of the multi-vibrator to said conductor path; and means in series in said path onwardly of said amplifier for indicating the frequency difference between said source and that of the said multivibrator.

3. In combination, a source of A.C. energy the frequency of which is to be determined; a mono-stable source of reference frequency; a Zener diode connecting the A.C. source and the reference-frequency source and passing to the reference-source only the positive half of the A.C. wave train it receives so as to unbalance the reference-source; a conductor path connecting the signal from the reference-source to that portion of the signal bypassing the diode; a switched amplifier connected to the joined signals, thereby to render the pulse-width at the switched amplifier equal to the difference between the frequency to be ascertained and the known frequency; and means in series with said switched amplifier for rendering an indication from the output of said switched amplifier of said pulse width so as to provide a basis for an indication of that frequency which is to be determined.

4. In combination for providing a basis for ascertaining and indicating the frequency of a source cf A.C. energy of unknown frequency: a source of A.C. energy of unknown frequency; a conductor path leading onwardly from said source; clipping means in shunt in said path for passing onwardly in divided circuit the clipped positive half-wave of the source-energy; a semi-conductor actuated mono-stable multivibrator having a known frequency and electrically connected to one of the division-paths of said divided circuit onwardly of said clipping means so as to emit a signal when unbalanced; and a semi-conductor, constituting a switched amplifier, electrically connected to the other of the division paths onwardly of said clipping means and also connected to the signal emanating from said multivibrator; whereby the pulse width emitted from the switched amplifier corresponds to the difference in frequency between that of the unknown-frequency A.C. source-energy and that of the known frequency multivibrator reference device.

5. In combination: a source of A.C. energy of unknown frequency; a Zener diode in series with said source; a mono-stable multivibrator, including a pair of vibrator actuating transistors, in divided circuit with said diode and constituting a reference-source of signals; a conductor path connecting the output of said multivibrator with said conductor path onwardly of the remainder-output of said diode; a switched amplifier in series in said conductor path onwardly of the junction of the output of the multivibrator with the remainder-output of said diode; means in series in said conductor path onwardly of said junction for filtering the signals transmitted to same in said conductor path; and means in series with said filtering means for presenting a visual indication from which said unknown frequency can be determined.

6. In combination for ascertaining the frequency of an A.C. signal of unknown frequency: first means through which only the positive half of the A.C. signal is to be passed; means for passing a part of said entire A.C. signal through said first means while passing the remainder of said signal onwardly; a normally balanced, mono-stable reference means of known frequency; means for passing said positive half of the A.C. signal to said mono-stable reference means so as to unbalance said reference means; means for passing the output signal from the unbalanced mono-stable reference means into juncture with said onwardly passing remainder of the input A.C. signal; switched-amplifier means; and means for passing the joined signals through said switched amplifier means so as to cause the latter means to emit a pulse of a width proportioned to the difference in frequency between the frequency of the originally input A.C. signal and the frequency of said reference means, thereby to enable indication of the frequency of the A.C. input signal of originally unknown frequency.

References Cited in the file of this patent

UNITED STATES PATENTS

| | | |
|---|---|---|
| 2,444,429 | Cleeton | July 6, 1948 |
| 2,513,525 | Shenk et al. | July 4, 1950 |
| 2,575,087 | Baker | Nov. 13, 1951 |
| 2,856,526 | Merrill | Oct. 14, 1958 |